United States Patent Office 3,088,871
Patented May 7, 1963

3,088,871
PROCESS OF STIMULATING THE CENTRAL NERVOUS SYSTEM
Carl C. Pfeiffer, Decatur, Ga., assignor to Riker Laboratories, Inc., Northridge, Calif., a corporation of Delaware
No Drawing. Filed May 19, 1959, Ser. No. 814,137
9 Claims. (Cl. 167—65)

This application is a continuation-in-part of my co-pending application, Serial No. 694,911, filed November 7, 1957, which is in turn a continuation-in-part of my prior application, Serial No. 623,303, filed November 20, 1956, both now abandoned.

This invention relates to a process for producing central nervous system stimulation in mammals by administering 2-dimethylaminoethanol or its acid-addition salts.

Acetylcholine is known to be an important hormone in activating the central nervous system. When this substance is applied to the exposed brain, animals have focal seizures which originate at the site of application. This seizure activity can be stopped by the administration of atropine, which is known to block some of the actions of acetylcholine. Efforts have been made to increase the amount of acetylcholine in the brain to obtain some degree of stimulation of mental activity by administering acetylcholine or choline to the patient. These efforts have been unsuccessful. These unsatisfactory substances have apparently failed to diffuse successfully through the two membranal barriers which protect the central nervous system. The first of these barriers is the blood-brain barrier, which is an ill defined membrane around the capillary blood vessels which nourish the brain, and the second is the nerve membrane, which may prevent choline or acetylcholine from entering the nerve cell, where the choline would be synthesized into acetylcholine, which could perform its normal function of stimulating metabolism and the transmission of some nerve impulses.

That choline is ineffective in passing one or more of these membranal barriers is evidenced by the fact that choline chloride has no effect on the brain of man when given in doses as high as 6.0 grams per day. Choline chloride also does not produce epileptic seizures in rats nor does it have an effect on seizure thresholds of rats and mice when given in doses of 1.0 gm. per kilogram of body weight daily for a period of 2 to 6 weeks.

In contrast with the negative results obtained with choline and acetylcholine, I have discovered that 2-dimethylaminoethanol and its acid-addition salts and therapeutic compositions containing them, produce epileptic seizures in rats on chronic administration, lower the pentylenetetrazol seizure threshold in mice, and produce central nervous system stimulation in man with dosages of 2 to 1000 milligrams per day (based upon weight of base administered). This central nervous system stimulation in man is manifested clinically in prevention of migraine headaches, relaxation headaches, and the prevention of mental depression. Among other concomitant advantages in humans provided by therapeutic compositions in accordance with this invention are: relief of functional bowel distress, increase in peripheral circulation, a more regular menstrual cycle and improvement of behavior disorders in children.

While it is not intended to rely upon any theory to explain the therapeutic effectiveness of the products, compositions and process of the invention, preliminary scientific evidence available to date indicates that 2-dimethylaminoethanol and its acid-addition salts first possess the property of readily diffusing through the two membranal barriers protecting the central nervous system and then secondly possess the property, once inside the membranes, of providing a precursor which is synthesized in the cells to acetylcholine or an acetylcholine-like compound. Presumably, the acetylcholine-like compound then provides the stimulation of the central nervous system. While the preliminary evidence suggests that this mechanism may be involved, it is not my intention to suggest that the authenticity of this mechanism has been established nor do I intend to be bound by it. Tests clearly show, however, that the products, compositions and process of the invention provide excellent central nervous system stimulation, regardless of what mechanism may actually be involved.

By virtue of the ability of the novel chemical compounds, the therapeutic compositions and process of the invention to stimulate the central nervous system and thereby treat mental depression, a useful tool is provided in the treatment and cure of mental disorders in human beings. Human clinical trials conducted with the compounds, compositions and process of the inventions have provided significant relief from mental depression and a feeling of well-being in the patients and enabled them to think more clearly and in an organized way. In other patients relief from hypertension, headaches, irregular bowel habits, irregular menstrual cycle, general restlessness and behavior disorders have been achieved. In behavior disorders and enuresis of children, marked benefit has been obtained.

It is an object of the present invention to provide a process for producing stimulation of the central nervous system.

Other objects will be apparent to those skilled in the art from reading this specification.

The acid-addition salts of the base employed in the process of this invention are those of certain organic carboxylic and other organic acids. These acid-addition salts are particularly suitable for therapeutic use since they provide therapeutic compositions of excellent physical, chemical and therapeutic properties. They are generally weakly acidic, so that they do not produce the untoward results inherent in administering highly acidic substances to the patient. Among these suitable acid-addition salts of the bases of this invention with an organic acid are: the lactate, acetate, ascorbate, nicotinate, citrate, neutral tartrate, acid tartrate, 3,4,5-trimethoxybenzoate, p-aminobenzoate, p-acetylaminobenzoate, salicylate, ortho-, meta- or para-aminosalicylate, adenosinate, creatinate, succinate, benzilate, gamma aminobutyrate, fumarate, phthalate, d-pantothenate, d-pantoate, benzoate, propionate, pyruvate, beta-resorcylate, etc.

The salts of ascorbic, nicotinic and pantothenic acids are particularly desirable since they also provide vitamin activity and may enhance the formation of acetylcholine in the cell. The salts of adenosine and creatine are advantageous because of the enzyme or nutritional properties imparted by the said moiety when these salts are administered. Novel salts of certain of the aromatic carboxylic acids are particularly suitable since they are substantially non-hygroscopic and yet will release the therapeutically active base for use by the body thereby permitting stimulation of the central nervous system. Among these salts are the beta-resorcylate, p-acetylaminobenzoate and benzilate. These novel salts are substantially non-hygroscopic even when exposed to a relative humidity of about 50% for a period of 3 days. The p-acetylaminobenzoate is particularly outstanding since, in addition to being substantially non-hygroscopic, it is very soluble in water. The non-acylated p-aminobenzoates are also substantially non-hygroscopic, however, they are less suitable because of their reduced solubility in water. The lack of hygroscopicity of these salts provides important advantages in providing dry pharmaceutical products according to the invention.

Contemplated among the novel organic acid-addition salts are the salts or adsorbates of a cation exchange resin. Such cation exchanges resins as Dowex 50 (a sulfonated copolymer of styrene and divinyl benzene) and Amberlite IRC–50 (a copolymer material having free carboxyl groups to provide the cation exchanging properties) may be employed for this purpose.

The therapeutic compositions which may be employed in the process of the present invention for producing stimulation of the central nervous system are dosage forms of pharmaceutical compositions, containing as the active ingredient, 2-dimethylaminoethanol or one of its acid-addition salts. These pharmaceutical compositions are desirable in unitary dosage form suitable for administration orally, by inhalation or parenteral injection, or by topical or rectal administration. These compositions comprise tablets, capsules, injectable solutions, powders, syrup elixirs and aerosol compositions for inhalation therapy containing the active ingredient with a liquefied propellant fluid, such as one of the fluorinated lower alkanes. The active ingredient shall desirably be present in an amount of from 2 to 500 milligrams and preferably 5 to 100 milligrams, (based upon the weight of therapeutic base) for each dosage unit.

For parenteral injection the pharmaceutical compositions should desirably contain the active ingredient in the form of a non-toxic acid-addition salt of the 2-dimethylaminoethanol. In the case of pharmaceutical preparations suitable for oral or inhalation administration, either the free-base or one of its non-toxic acid-addition salts may desirably be employed.

In preparing the acid-addition salts of 2-dimethylaminoethanol, either inorganic or organic acids may be employed. The acid employed is desirably one which is non-toxic to human beings at the dosage employed. Among the inorganic acids which may be employed in preparing the acid-addition salts are the mineral acid salts such as those of hydrochloric, phosphoric, sulfuric, hydrobromic and hydroiodic acids. Either the neutral or acid salts may be prepared. Other inorganic acids which may be employed are thiocyanic, carbonic and sulfurous acids.

Among the organic acids which may be employed are those which are non-toxic in the doses employed. Among these are lactic, acetic, ascorbic, gallic, nicotinic, citric, tartaric, p-aminobenzoic, p-acetylaminobenzoic, salicylic, 3,4,5-trimethoxybenzoic, adenosine, creatine, succinic, fumaric, ortho-, meta-, or para-aminosalicylic, phthalic, benzilic, gammaaminobutyric, d-pantothenic, benzoic, propionic, pyruvic, and beta-resorcylic acids, etc. Also the cation exchange resin adsorbates, such as those of Dowex 50 and Amberlite IRC–50 may be employed.

The acid addition salts contemplated for use in the present invention may be prepared by neutralizing the base of the invention with the corresponding inorganic or organic acid.

The present invention comprises the process of stimulating the central nervous system of mammals, and particularly humans, by administering 2-dimethylaminoethanol or its acid-addition salts of a non-toxic acid. As has been explained hereinabove this base and its addition salts produce stimulation of the central nervous system as manifested by prevention of migraine headaches, relaxation headaches and the prevention of mental depression. There is also obtained relief of functional bowel distress, increase in peripheral circulation, a more regular menstrual cycle and improvement of behavior disorders. The benefits of the invention are obtained by administering orally, by inhalation or by parenteral injection from about 2 to 1000, or preferably 2 to 250 or 500, milligrams daily (based on weight of base) of 2-dimethylaminoethanol or an acid-addition salt thereof of a non-toxic acid where treatment of institutionalized schizophrenic patients is involved. In providing central nervous stimulant effect in the treatment of functional disorders, doses of 2 to 100 milligrams daily are suitable. The preferred dosage is from about 10 to 75 milligrams daily. For oral and inhalation therapy, either the base or an acid-addition salt thereof may be employed. For parenteral injection it is desirable to employ an acid-addition salt of the base. In amounts less than 2 milligrams daily the degree of stimulation may be insufficient, whereas in excess of 100 milligrams daily, the dosage may produce excessive stimulation. Preferably for adults, about 10 to 75 milligrams daily, and more preferably about 25 to 75 milligrams daily (based on the weight of therapeutic base) shall be employed. For children it is desirable to employ more medicament, usually 50 milligrams daily.

The dosages employed in this invention are in contrast to the dosage of choline which the body will tolerate, but without obtaining stimulation of the central nervous system. In the case of choline, 2,000 to 6,000 mg. per day may be tolerated without producing any substantial stimulation of the central nervous system.

The quantitative aspects of the stimulant activity of the active stimulant base in accordance with this invention compared with somewhat chemically-related compounds not contemplated within the scope of the present invention are illustrated by determining their effect on the metrazol threshold in mice. In this test, described in the publication of Orloff et al., "Proc. Soc. Exper. Biol. and Med.," vol. 70, pp. 254–7 (1949), mice were given over a period of 2 months drinking water containing one of a number of bases in sufficient amount to constitute a 0.03 molar concentration. The mice were given metrazol (0.5%) by timed intravenous injection. The lowering of the metrazol threshold, measured in accordance with said Orloff et al. technique is indicative of the base-induced stimulation. The lower the metrazol threshold value, the greater the stimulant activity of the base. The results obtained are reported in Table I below, showing that 2-dimethylaminoethanol is unexpectedly superior to the other chemically related compounds tested in stimulant activity.

TABLE I

| Base: | Metrazol threshold |
|---|---|
| 2-dimethylaminoethanol | 0.45 |
| Tap water control | 1.00 |
| Choline chloride | 1.00 |
| 2-methyl-2-dimethylaminoethanol | 0.93 |
| 2-diethylaminoethanol | 0.85 |
| N-methyl-diethanolamine | 1.04 |
| Dimethylaminobutanol | 1.02 |

The process of providing stimulation of the nervous system may be practiced by administering the pharmaceutical compositions according to this invention, which have been described hereinabove.

In the central nervous stimulant therapy according to the invention employing 2-dimethylaminoethanol and its acid-addition salts, it has been discovered after clinical trials that there are certain biochemical adjuvants which assist in obtaining the therapeutic results which the present invention makes possible. Among these adjuvants are one or more of the following: d-pantothenic acid, pyridoxine, l-methionine and cyanocobalamin. The first three of these adjuvants are particularly suitable for oral therapy with therapeutic compositions in tablet form. For intramuscular administration it is desirable to use an acid-addition salt of the invention along with d-calcium pantothenate, pyridoxine and cyanocobalamin in a sterile aqueous solution.

It is believed that the adjuvant d-pantothenic acid may assist in acetylating the therapeutic base within the body. The adjuvant l-methionine is one of the body's important methylating agents and may be useful in methylating the acetate of the base into acetylcholine inside the cells of the brain. Cyanocobalamin is believed to act to keep the terminal sulfhydryl group of the co-enzyme A in the body reduced so that the reduced sulfhydryl group may assist in transferring an acetyl group to the bases of the invention inside the brain cells. Pyridoxine is believed to assist in cleaving the thio-ethers in the body and in producing transmethylation reactions; both of which reactions may be involved in synthesizing acetylcholine from the bases of the invention inside the body cells.

In order more clearly to disclose the nature of the present invention, specific examples illustrating the preparation of products in accordance with this invention will hereinafter be described. It should be understood, however, that this is done solely by way of example and is intended neither to delineate the scope of the invention nor limit the ambit of the appended claims. Unless otherwise stated, the quantities of materials are referred to in terms of parts by weight.

*Example 1*

About 26 grams of 2-dimethylaminoethanol were added with stirring to a solution of 50 grams of gallic acid dissolved in 200 ml. of methanol. The resulting 2-dimethylaminoethanol gallate crystallized readily and after being separated by filtration and washed with additional methanol, was dried under vacuum at 100° C. for two hours. The product weighed 65 grams and had a melting point of 178° C.

*Example 2*

About 18 grams (0.2 mole) of 2-dimethylaminoethanol were added with stirring to a solution of 30.8 grams (0.2 mole) of beta-resorcylic acid dissolved in 100 ml. of isopropanol. Upon adding an equal volume of ether, the 2 - dimethylaminoethanol beta - resorcylate precipitated. Upon being filtered and dried the 30 grams of crystals isolated were found to have a melting point of 118° C.

*Example 3*

About 15 grams of tartaric acid were dissolved in 120 ml. of hot isopropanol. While still hot 8.9 grams of 2-dimethylaminoethanol were added to the solution and the solution was allowed to cool to room temperature overnight. The crystalline mass of 2-dimethylaminoethanol acid tartrate which formed was broken up, filtered, and washed with isopropanol. After the crystals were dried under vacuum at 45–50° C., they weighed 22 grams and had a melting point of 112–113° C.

*Example 4*

About 15 grams of tartaric acid were dissolved in 12 ml. of water. To the resulting solution were added 8.9 grams of 2-dimethylaminoethanol and the solution permitted to stand overnight. The dimethylaminoethanol acid tartrate which crystallized was filtered off, washed with a small amount of water and dried at 45–50° C. under high vacuum. The yield was 7 grams and the salt had a melting point of 112–113° C.

*Example 5*

About 13.1 grams of salicyclic acid were dissolved in 25 ml. of hot isopropanol. While still hot, 8.9 grams of 2-dimethylaminoethanol were added to the solution and the solution permitted to cool. Then 10 ml. of ethyl ether were added and the dimethylaminoethanol salicylate which crystallized was filtered off, washed with a small amount of a mixture of isopropanol-ether (3:1) and dried. The yield was 21.5 grams having a melting point of 79° C.

*Example 6*

The procedure of Example 3 was repeated, employing one-half as much tartaric acid. The resulting product was 2-dimethylaminoethanol neutral tartrate which was a liquid.

*Example 7*

The procedure of Example 1 was repeated, replacing the gallic acid with 11.6 grams of fumaric acid and employing 8.9 grams of 2-dimethylaminoethanol and 120 ml. of isopropanol as the solvent instead of methanol. The solvent was removed by vacuum evaporation and residue first dried over potassium hydroxide pellets followed by drying over sulfuric acid. The resulting product was 2-dimethylaminoethanol acid fumarate crystals which had a melting point of 74° C.

*Example 8*

The procedure of the preceding example was repeated, employing one-half as much fumaric acid, namely, about 6.0 gms. and employing 60 ml. of isopropanol as solvent. The resulting product was 2-dimethylaminoethanol neutral fumarate which was a liquid.

*Example 9*

The procedure of Example 1 was repeated, replacing the gallic acid with an equal molecular amount of creatine. The resulting product was 2-dimethylaminoethanol creatinate which had a melting point of 288–292° C.

*Example 10*

The procedure of Example 1 was repeated, replacing the gallic acid with an equal molecular amount of succinic acid. The resulting product was 2-dimethylaminoethanol succinate which had a melting point of 173–178° C.

*Example 11*

About 40 grams (0.223 mole) of p-acetylaminobenzoic acid was dissolved in 600 ml. of absolute methanol, and the solution was heated to reflux temperature. Heating was discontinued, and, with mechanical stirring, 19.9 grams (0.223 mole) of 2-dimethylaminoethanol was added through a dropping funnel as fast as the exothermic nature of the reaction permitted. The reaction mixture was allowed to cool to room temperature (2.5–3 hours) under mechanical agitation, and the solution was suction-filtered through Celite filter aid. The filtrate was poured into 500 ml. of anhydrous ethyl ether, seeded with a few crystals of 2-dimethylaminoethanol p-acetylaminobenzoate. The seeding crystals were obtained by introducing 3 to 6 drops of the filtered reaction mixture into a test tube containing 10 ml. of anhydrous diethyl ether. The contents of the test tube were thoroughly shaken and allowed to stand at room temperature. The salt crystallized out within not more than 10–15 minutes. The crude product (48.4 grams, 80.9% yield) was recrystallized from an absolute ethanolethyl acetate solvent system by suspending the salt in boiling anhydrous ethyl acetate and just enough absolute ethanol was gradually added to effect solution after which the solution was concentrated to about two-thirds of the original volume on the steam bath, charcoal treated, and suction-filtered through Celite filter aid. The white crystals of 2-dimethylaminoethanol-p-acetylaminobenzoate obtained, dried at room temperature at a pressure of 0.08 mm. Hg for 15 hours, melted at 159.0–161.5° C.

*Example 12*

About 32.7 grams (0.239 mole) of p-aminobenzoic acid was dissolved in 163 ml. of absolute methanol, and the solution was heated to reflux temperature. Heating was discontinued, and with mechanical stirring, 21.3 grams (0.239 mole) of 2-dimethylaminoethanol was added through a dropping funnel as fast as the exothermic nature of the reaction permitted. The reaction mixture was allowed to cool to room temperature (2½–3 hours) under mechanical agitation, and the solution was suction-filtered through Celite filter aid. The filtrate was poured into 1000 ml. of anhydrous diethyl ether, seeded with a few crystals of 2-dimethylaminoethanol-p-aminobenzoate from a previous preparation. Crystallization ensued immediately. The crude product (32.4 grams, 59.9% yield) was recrystallized from ethyl acetate. The recrystallized dimethylaminoethanol-p-aminobenzoate, dried at room temperature under 0.08 mm. Hg pressure for 15 hours, melted at 138–140° C. Due possibly to the interference of the unsubstituted amino group of the p-aminobenzoic acid during complex formation, the crystalline substance was found to contain dimethylaminoethanol in a lower than the calculated 1:1 molar ratio.

*Example 13*

The procedure of Example 1 was repeated, replacing the gallic acid with 12.3 grams of nicotinic acid and employing 8.9 grams of 2-dimethylaminoethanol and 500 ml. of isopropanol as the solvent. The solvent was removed by vacuum evaporation at the temperature of a steam bath until the volume of the reaction mixture was reduced to about 250 ml. The vacuum evaporation was continued at room temperature. The resulting product was 2-dimethylaminoethanol nicotinate which was a syrupy liquid.

*Example 14*

The procedure of Example 1 was repeated, replacing the gallic acid with an equal molecular amount of lactic acid. The resulting product was 2-dimethylaminoethanol lactate, which was a liquid.

*Example 15*

The procedure of Example 1 was repeated, replacing the gallic acid with an equal molecular amount of acetic acid. The resulting product was 2-dimethylaminoethanol acetate, which was a liquid.

*Example 16*

The procedure of Example 1 was repeated, replacing the gallic acid with 17.6 grams of ascorbic acid and employing 8.9 grams of 2-dimethylaminoethanol. The methanol solvent was removed by vacuum evaporation. The resulting product was 2-dimethylaminoethanol ascorbate, which was a syrupy liquid.

*Example 17*

The procedure of Example 1 was repeated, replacing the gallic acid with an equal molecular amount of adenosine. The resulting product was 2-dimethylaminoethanol adenosinate, a syrupy liquid.

*Example 18*

The procedure of Example 1 was repeated, replacing the gallic acid with an equal molecular amount of phthalic acid. The resulting product was 2-dimethylaminoethanol phthalate, a syrupy liquid.

*Example 19*

About 5.7 grams (0.064 mole) of 2-dimethylaminoethanol in 5 ml. of water was neutralized to a pH of 6.4–6.8 with aqueous 10% sulfuric acid. To the solution was then added a solution of 15.25 grams (0.032 mole) of calcium d-pantothenate in 105 ml. of water. The resulting mixture was agitated and permitted to stand overnight. The calcium sulfate precipitate which formed was filtered and the water evaporated from the filtrate under reduced pressure at 25° C. The residue was subjected to a reduced pressure of 0.08 mm. of mercury for 46 hours. The residue, a yellow syrupy liquid, was dissolved in absolute methanol, the solution filtered and the methanol removed under reduced pressure. The residue was again dissolved in methanol and the methanol removed at reduced pressure. The resulting 2-dimethylaminoethanol-d-pantothenate was a yellow viscous material weighing 12.8 grams and having an optical rotation of plus 34.2°.

*Example 20*

The procedure of Example 1 was repeated, replacing the gallic acid with 12.2 grams of benzoic acid and employing 8.9 grams of 2-dimethylaminoethanol with 25 ml. of isopropanol as the solvent. The solvent was removed by vacuum evaporation. The resulting product was 2-dimethylaminoethanol benzoate, a syrupy liquid.

*Example 21*

The procedure of Example 1 was repeated, replacing the gallic acid with an equal molecular amount of propionic acid. The resulting product was 2-dimethylaminoethanol propionate, which was a liquid.

*Example 22*

The procedure of Example 1 was repeated, replacing the gallic acid with an equal molecular amount of pyruvic acid. The resulting product was 2-dimethylaminoethanol pyruvate, which was a liquid.

*Example 23*

The procedure of Example 1 was repeated, replacing the gallic acid with 19.2 grams of citric acid and employing 8.9 grams of 2-dimethylaminoethanol with 16 ml. of isopropanol as solvent. The solvent was removed by vacuum evaporation. The resulting product was 2-dimethylaminoethanol di-hydrogen citrate, a syrupy liquid.

*Example 24*

The procedure of Example 1 was repeated, replacing the gallic acid with an equal molecular amount of p-aminosalicylic acid. The resulting product was 2-dimethylaminoethanol p-aminosalicylate which had a melting point of 71–72° C.

*Example 25*

The procedure of Example 1 was repeated, replacing the gallic acid with an equal molecular amount of o-aminosalicyclic acid. The resulting product was 2-dimethylaminoethanol o-aminosalicylate.

*Example 26*

The procedure of Example 1 was repeated, replacing the gallic acid with an equal molecular amount of m-aminosalicylic acid. The resulting product was 2-dimethylaminoethanol m-aminosalicylate.

*Example 27*

The procedure of Example 1 was repeated, replacing the gallic acid with an equal molecular amount of 3,4,5-tri-methoxybenzoic acid. The resulting product was 2-dimethylaminoethanol 3,4,5-trimethoxybenzoate.

*Example 28*

About 25 grams of Dowex 50 resin (in the hydrogen exchanging condition) was mixed with 10 grams of 2-dimethylaminoethanol and the resulting adsorbate was rinsed with water and dried.

*Example 29*

About 11 grams of Amberlite IRC–50 (in the hydrogen exchanging condition) was mixed with 10 grams of 2-dimethylaminoethanol. The resulting adsorbate was rinsed with water and dried.

*Example 30*

About 5.07 grams (0.039 mole) of 1-pantoyl lactone was hydrolyzed in 50 ml. of water containing 9.0 grams of barium hydroxide octahydrate over a period of 3 hours at a temperature of 73–81° C. The excess barium was removed as barium carbonate by bubbling carbon dioxide through the hot reaction mixture and filtering the precipitate. The filtrate, containing approximately 0.019 mole of barium pantoate, was added to a solution of 3.39 grams (0.038 mole) of 2-dimethylaminoethanol in 5 ml. of water, and the solution neutralized to a pH of 6.8 with aqueous 10% sulfuric acid. The reaction mixture was permitted to stand overnight. The resulting barium sulfate precipitate was filtered and water was removed from the filtrate under reduced pressure at 25° C. and the resulting residue evaporated under vacuum at 0.1 mm. of mercury for 16 hours. The residue, a yellow syrupy liquid, was dissolved in absloute methanol and the solution filtered. The methanol was removed from the filtrate under reduced pressure at 25° C. and the solvent evaporated under vacuum. The dried residue was again dissolved in absolute methanol, filtered and again subjected to vacuum evaporation. The resulting yellow viscous material weighed 7.5 grams. The product, 2-dimethylaminoethanol-d-pantoate, gave an optical rotation of plus 12.9°, indicating that the levorotatory lactone apparently yielded a dextrorotatory acid upon barium hydroxide hydrolysis.

*Example 31*

To a solution of 11.4 grams (0.05 mole) of benzilic acid in 175 ml. of anhydrous ethyl ether was added a solution of 4.5 grams (0.05 mole) of 2-dimethylaminoethanol in 80 ml. of anhydrous ethyl ether, with agitation. A yellow oily material separated out immediately which formed a white crystalline precipitate within a few minutes. Several hours later, the crystalline material was filtered and recrystallized from a solvent system of ethanol and ethyl acetate. There was obtained 11.93 grams (a yield of 75%) of white crystals of the benzilic acid salt of 2-dimethylaminoethanol, having a melting point of 120.6–121.6° C.

As will be apparent to those skilled in the art, the various acid-addition salts of the invention may be produced by reacting substantially equal molecular proportions of base with an organic or inorganic acid in accordance with any of the foregoing examples. Thus, by employing 2-dimethylaminoethanol base, acid-addition salts may be produced from the following acids: hydrochloric, phosphoric, sulphuric, hydrobromic, hydroiodic, thiocyanic, boric, carbonic, and sulfurous acids, by mixing the acid and the base in equimolecular amounts in an inert solvent.

*Example 32*

A suitable formulation of tablets consist of:

| | Milligrams per tablet |
|---|---|
| 2-dimethylaminoethanol acid tartrate (equal to 10 mg. of free base) | 27.0 |
| Milk sugar | 50.5 |
| Powdered sugar with 3% corn starch | 50.5 |
| Dicalcium phosphate | 45.0 |
| Corn starch, USP (paste) (containing 10% water) | 1.0 |
| Calcium stearate | 1.0 |
| | 175.0 |

The 2-dimethylaminoethanol salt was mixed with the milk sugar, powdered sugar and dicalcium phosphate and the mixture passed through a No. 30 screen. The screened mixture was granulated with the corn starch paste and passed through a No. 16 screen. The mixture was dried at 130–135° C. and passed through a No. 20 screen. The calcium stearate was added and mixed and the resulting mixture compressed into tablets weighing 175 mg. each.

*Example 33*

This example illustrates a tablet form of medication for oral administration employing the para-acetylaminobenzoate salt of 2-dimethylaminoethanol as the stimulant ingredient:

| | Milligrams per tablet |
|---|---|
| p-Acetylaminobenzoate salt of 2-dimethylaminoethanol (equal to 25 mg. of base) | 75 |
| Polyvinyl pyrrolidone | 6 |
| Calcium stearate | 1 |

*Example 34*

A suitable formulation of an oral elixir consists of:

2-dimethylaminoethanol beta-resorcylate, 100 mg.
Elixir base to make 100 ml. volume.

The elixir base contains orange spirits, sugar syrup, ethyl alcohol and distilled water.

When this formula is administered in 5 cc. doses, each dose contains about 5 mg. of medicament.

*Example 35*

An illustrative example of preparing an aqueous solution for injection consists of placing 200 ml. of distilled water in a flask and adding 1 gram of 2-dimethylaminoethanol neutral tartrate with stirring, until solution is effected. The solution is filled into a clean, dry, 5 ml. ampule, and the ampule sealed and sterilized. Upon injecting the contents of one ampule, a dosage of 10 mg. of 2-dimethylaminoethanol neutral tartrate was administered.

*Example 36*

A suitable formulation of a dry-filled capsule consists of:

| | Mg. |
|---|---|
| 2-dimethylaminoethanol citrate | 75 |
| Lactose | 75 |

The above ingredients were thoroughly mixed and placed in a hard gelatine capsule.

*Example 37*

A suitable formulation of a soft gelatine capsule consists of:

| | Mg. |
|---|---|
| 2-dimethylaminoethanol salicylate | 10 |
| Peanut oil | 200 |

The above ingredients were thoroughly mixed and enclosed in a soft gelatine capsule.

*Example 38*

A suitable formulation of aerosol administration was prepared as follows:

About 3.25 grams of a solution containing 23.5% by weight of 2-dimethylaminoethanol hydrochloride in ethanol was cooled to minus 26° C. To this cooled solution was added 6.75 grams of a mixture of 61.5% by weight of dichlorodifluoromethane ("Freon 12") and 38.5% of dichlorotetrafluoroethane ("Freon 114"). The resulting mixture was sealed in a suitable container provided with a valve capable of discharging metered amounts of the material. The final mixture contained about 7.65% by weight of 2-dimethylaminoethanol hydrochloride, equivalent to about 5% of 2-dimethylaminoethanol free base.

*Example 39*

This example illustrates a tablet form of medication for oral administration employing a biochemical adjuvant along with a form of 2-dimethylaminoethanol:

| | Milligrams per tablet |
|---|---|
| 2-dimethylaminoethanol-p-acetylamino benzoate equal to 20 mg. of base) | 64.1 |
| Pyridoxine | 5.0 |
| d-Calcium pantothenate | 50.1 |
| l-Methionine | 200.0 |
| Milk sugar | 51.45 |
| Powdered sugar with 3% corn starch | 51.45 |
| Dicalcium phosphate | 45.0 |
| Corn starch USP (paste) (containing 10% water) | 1.5 |
| Calcium stearate | 1.5 |
| | 425.0 |

The 2-dimethylaminoethanol salt, pyridoxine, d-calcium pantothenate, and l-methionine were mixed with the milk sugar, powdered sugar aid dicalcium phosphate and the mixture passed through a No. 30 screen. The screened mixture was granulated with the corn starch paste and passed through a No. 16 screen. The mixture was dried at 130–135° C. and passed through a No. 20 screen. The calcium stearate was added and mixed and the resulting mixture compressed into tablets weighing 425 mg. each.

*Example 40*

This example illustrates a sterile injectible aqueous solution for intramuscular administration employing a biochemical adjuvant in combination with a salt of 2-dimethylaminoethanol:

2-dimethylaminoethanol hydrochloride (equivalent
to 20 mg. of base) _____ mg__ 28.1
d-Calcium pantothenate _____ mg__ 10.0
Pyridoxine _____ mg__ 10.0
Cyanocobalamin _____ micrograms__ 100
Sterile distilled water, q.s. 1 ml.

Indicative of the nature of the central nervous system stimulation produced in mammals by the compositions in accordance with the invention are the results of a clinical testing program, which will now be described. After first determining the lack of toxicity of 2-dimethylaminoethanol as a result of extensive chronic toxicity studies in animals, a double-blind clinical study was conducted on 35 patients. These patients were subjected to therapy with tablets containing 10 mg. of 2-dimethylaminoethanol base as the tartrate salt and compared with an identical placebo. During the first week patients were given a dose of 1 tablet per day and for the second week the dosage was two tablets per day. Thereafter for a period of 3 months the subjects were allowed to increase, decrease or discontinue their medication at will, but during the last 6 weeks all subjects were given the 2-dimethylaminoethanol tablets. Significant subjective changes of the dimethylaminoethanol treated group were (1) increased muscle tone, (2) increased mental concentration, and (3) changes in sleeping habits. In most cases the change in sleeping habits resulted in the patient requiring less sleep. Others reported sounder sleep with earlier, clear-minded awakening. A mood change in the patients to greater affability or mild euphoria coupled with a more out-going or out-spoken personality was noted. No significant changes occurred in heart rate, blood pressure, muscle strength, hand-steadiness, vital capacity and body weight, or the levels of fasting gastric acidity, protein bound iodine and blood cholesterol. In 25 of the 35 patients mental stimulation was noted which increased daily in the first week of medication and was greater than that of amphetamine. Unlike amphetamine, the stimulation lasted 24 to 48 hours after the discontinuation of the 2-dimethylaminoethanol and was not accompanied by a rebound period of depression.

The terms of expressions which I have employed are used as terms of description and not of limitation, and I have no intention, in the use of such terms and expressions, of excluding any equivalents of the features shown and described or portions thereof, but I recognize that various modifications are possible within the scope of the invention claimed.

What is claimed is:

1. The process of stimulating the central nervous system in mammals, which comprises administering to the mammal a significant amount of an active ingredient selected from the class consisting of 2-dimethylaminoethanol and acid-addition salts thereof, 2. The process of stimulating the central nervous system in mammals as defined by claim 1, wherein the acid-addition salt is of an organic acid.

3. The process of stimulating the central nervous system in mammals as defined by claim 1, wherein the acid-addition salt is of an inorganic acid.

4. The process of stimulating the central nervous system in mammals as defined by claim 1, wherein the active ingredient comprises the para-acetylaminobenzoic acid salt of 2-dimethylaminoethanol.

5. The process of stimulating the central nervous system in mammals as defined by claim 1, wherein the active ingredient comprises the para-aminobenzoic acid salt of 2-dimethylaminoethanol.

6. The process of stimulating the central nervous system in mammals, which comprises administering to the mammal a significant amount of an active ingredient selected from the class consisting of 2-dimethylaminoethanol and acid-addition salts thereof, said active ingredient being administered in an amount of between about 2 and 1000 milligrams per day calculated as free base.

7. The process of stimulating the central nervous system in humans, which comprises administering to the human from about 2 to 500 milligrams daily of an active ingredient selected from the class consisting of 2-dimethylaminoethanol and acid-addition salts thereof, said weight based upon the weight of base.

8. The process of stimulating the central nervous system in humans, which comprises administering to the human from about 2 to 250 milligrams daily of an active ingredient selected from the class consisting of 2-dimethylaminoethanol and acid-addition salts thereof, said weight being based upon the weight of base.

9. The process of stimulating the central nervous system in humans, which comprises administering to the human from about 10 to 75 milligrams daily of an active ingredient selected from the class consisting of 2-dimethylaminoethanol and its acid-addition salts, said weight being based upon the weight of 2-dimethylaminoethanol base.

References Cited in the file of this patent

UNITED STATES PATENTS 2,486,177     Korner _____ Oct. 25, 1949
2,675,405     Carrara _____ Apr. 13, 1954

OTHER REFERENCES

Jukes: J. Biol. Chem., vol. 157, pp. 419–420, 1945.
Mark: J. Pharmacol. Exptl. Therap., vol. 98, No 4, part 1. pp. 405–408, 1950.
Du Vigneaud: J. Biol. Chem. 164, 603–613, 1946.
Jenkins et al.: The Chemistry of Organic Medicinal Products, third ed., John Wiley & Sons, p. 326 (1941).
Richter: Organic Chemistry, John Wiley & Sons, p. 246 (1952).
Kleiner: Human Biochemistry, C. V. Mosby Co., p. 136 (1951).
Jukes: J. Biol. Chem. 157, pp. 419–420 (1945).
Mackenzie: J. Biol. Chem. 203, p. 743 (1953).
Pfeiffer: Science 107, p. 94–96 (1948).
Chem. Abs. (1), vol. 20, p. $2727^3_4$ (1926).
Chem. Abs. (2), vol. 24, p. $1083_4$ (1930).
Chem. Abs. (3), vol. 32, p. $1052_5$ (1938).
Chem. Abs. (4), vol. 33, p. 7897 (1939).
Chem. Abs. (5), vol. 41, p. 524c (1947).
Chem. Abs. (6), vol. 41, p. 2737e (1947).
Chem. Abs. (7), vol. 49, p. 1034c (1955).
Chem. Abs. (8), vol. 50, p 10778d (1956).
Chem. Abs. (9), vol. 50, p. 11518a (1956).
(Chem. Abst., vol. 1, date in POSL.)

UNITED STATES PATENT OFFICE
CERTIFICATE OF CORRECTION

Patent No. 3,088,871                           May 7, 1963

Carl C. Pfeiffer

It is hereby certified that error appears in the above numbered patent requiring correction and that the said Letters Patent should read as corrected below.

Column 3, line 3, for "exchanges" read -- exchange --; column 9, line 2, for "absloute" read -- absolute --; column 10, line 67, for "50.1" read -- 5.0 --; column 11, line 3, for "aid" read -- and --; line 59, for "of" read -- and --.

Signed and sealed this 19th day of November 1963.

(SEAL)
Attest:

ERNEST W. SWIDER

Attesting Officer

EDWIN L. REYNOLDS

Acting Commissioner of Patents